June 10, 1969  G. G. SCARROTT  3,449,038
ELECTRO-OPTICAL SWITCHING DEVICES
Filed March 9, 1965
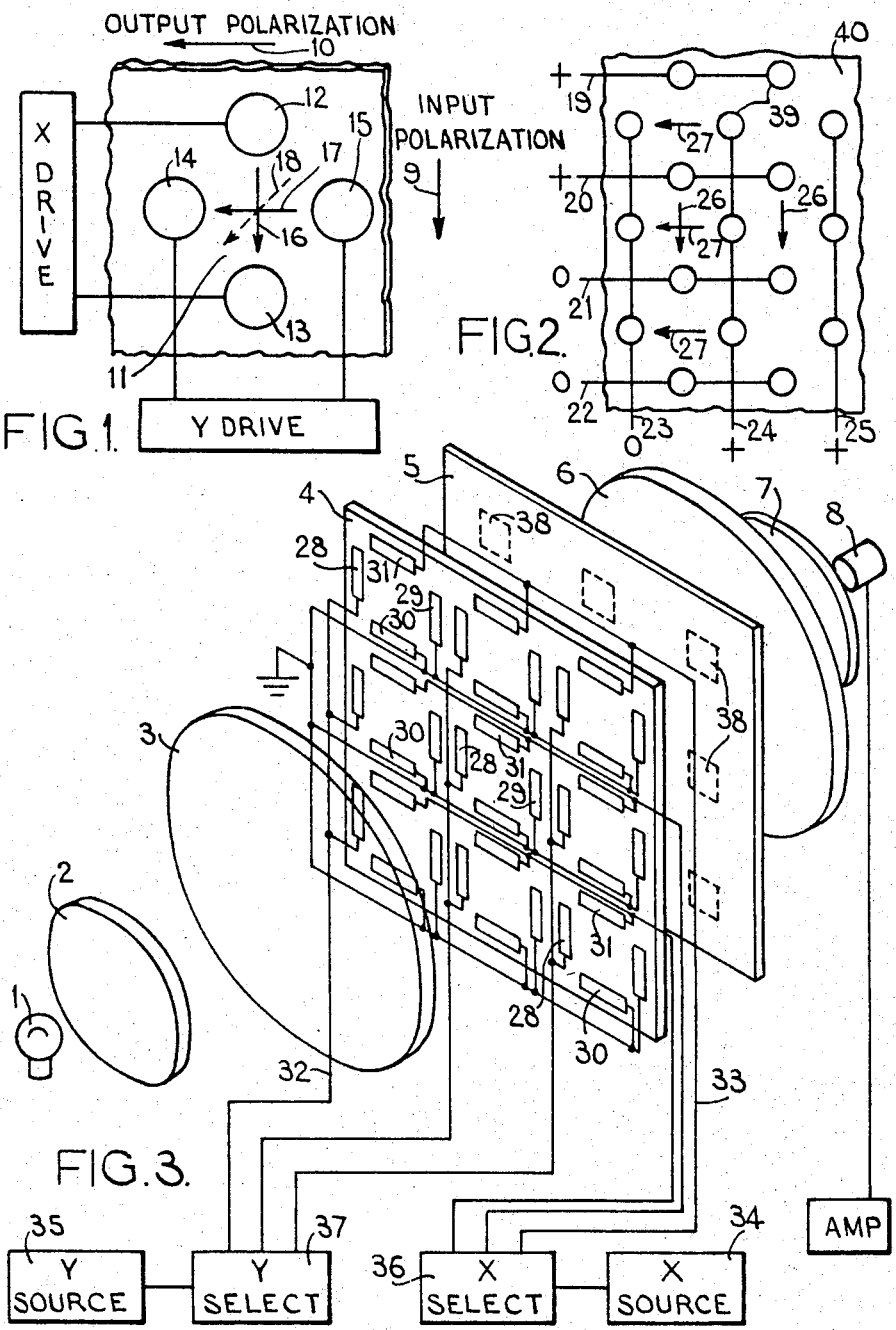
INVENTOR
GORDON GEORGE SCARROTT
BY
ATTORNEYS

United States Patent Office

3,449,038
Patented June 10, 1969

3,449,038
ELECTRO-OPTICAL SWITCHING DEVICES
Gordon George Scarrott, Wokingham, England, assignor to International Computers and Tabulators Limited
Filed Mar. 9, 1965, Ser. No. 438,320
Claims priority, application Great Britain, Mar. 10, 1964, 10,133/64
Int. Cl. G02f 1/26, 1/36
U.S. Cl. 350—150                    9 Claims

ABSTRACT OF THE DISCLOSURE

An electro-optical device is provided to control the transmission of light through an information storage medium by means of mutually orthogonal electrical fields applied to an electro-optically active material. This material is positioned between two polarizers, the polarizers having mutually orthogonal planes of polarization, and upon application of two electrical fields, each parallel to the planes of polarization of the polarizers, respectively, a resultant electrical field is produced. The resultant field operates in a plane perpendicular to the light transmission path to elliptically polarize light through the material and thereby allow transmission of light through the device. A matrix arrangement is effected by providing a plurality of pairs of conductors to separate areas on the material so that by selectively energising appropriate conductors, particular switching areas can be made to elliptically polarize light therethrough.

---

This invention relates to switching devices utilising the Kerr electro-optical effect.

Several switching devices employing the Kerr effect are disclosed in U.S. Patent 3,027,806. Each of these devices uses a birefringent material positioned between crossed polarizers and provided with a pair of electrodes to which electrical potentials may be applied. The light transmitted through the system is proportional to $\sin^2 (V/V_0)$, where V is the voltage difference between the electrodes and $V_0$ is a constant dependent upon the material. The light transmission is zero when the voltage difference is zero. As the voltage difference increases, the light transmission rises to a maximum, falls to zero, rises again to a second maximum, falls to zero again and so on. The specification describes how the light transmission may be related by logic functions, such as AND and EXCLUSIVE OR, to input signals in the form of electrical potentials applied to the pair of electrodes, with or without initial biasing of the electrodes. A number of the devices operating in the AND gate mode may be assembled as a matrix to provide an electro-optical shutter by which light from a source may be allowed to pass through a selected area by the energisation of a pair of matrix selection wires. Such a matrix is suitable for selectively reading an optical store, such as a plurality of spaced record areas on a sheet of photographic film.

A disadvantage of the devices referred to above is that the degree of light transmission is a function of the resultant magnitude of two or more applied voltages. Consequently, one control voltage only is sufficient to cause partial operation of the device and the amplitudes of the applied voltages have to be accurately controlled.

It is the object of the invention to provide an improved electro-optical switch for which the application of one only out of two control voltages causes substantially no change in the light transmission of the switch.

According to one aspect of the invention an electro-optical device includes an electro-optically active material positioned between first and second polarizers along a light transmission path, said first and second polarizes being arranged with their planes of polarization at right angles and means for applying to said material first and second electrical control fields perpendicular to the light transmission path, which fields are respectively parallel to the planes of polarization of said first and second polarizers.

According to another aspect of the invention a matrix of electro-optical devices includes first and second polarizers spaced apart along a light transmission path, said polarizers being arranged with their planes of polarization at right angles, electro-optically active material positioned between said polarizers having a plurality of switching areas lying perpendicular to the light transmission path, a pattern of electrodes applied to said material arranged so that each switching area lies between two opposed pairs of electrodes, the two opposed pairs bounding each individual switch area respectively being spaced apart in directions parallel to the planes of polarization of said first and second polarizers and perpendicular to said light transmission path, and means for selectively applying electrical potentials to the electrodes. The electrodes may be arranged in rows and columns, and connected by row and column conductors, the means for selectively applying potentials to hte electrodes then including means for selecting a single row and a single column conductor for the application of an electrical control signal to select a single switch area for operation. The matrix of switch areas may be incorporated in an electro-optical shutter having a source of light and means for detecting the transmission of light through a selected switch area. Such a shutter may then be incorporated in apparatus for reading information recorded in optically detectable form on a member in which the member lies in the light transmission path parallel to the switching matrix.

Apparatus embodying the invention will now be described, by way of example, with reference to the accompanying drawing, in which—

FIGURE 1 illustrates the arrangement of an electro-optical switch area,

FIGURE 2 shows a selection arrangement for a plurality of switch areas, and

FIGURE 3 shows, diagrammatically, information reading apparatus utilising a matrix of switch areas.

One example of the use of the invention will be described, as illustrated diagrammatically in FIGURE 3, as applied to a selection system for a photographic store. The elements of the store consist of a light source 1, an optical system, represented by a lens 2, a first polarizer 3, a matrix of electro-optical switches 4, a matrix 5 of film storage areas, a second polarizer 6, a further optical system, represented by a lens 7, and a photosensitive pick up device 8. Thus, the basic elements of the store are similar to those of the store described in the patent already referred to. However, as will be explained, the way in which the switches are operated is quite different from that described in the reference patent.

Another form of photographic store to which the invention may be applied is described in British specification No. 933,567. The electro-optic selection system according to the invention may be substaituted for the mechanical shutter system of this specification, providing for greatly increased operating speed of the store.

The mode of operation of the electro-optical switches will be explained with reference to FIGURE 2, and for convenience of description, the planes of polarization of the first, or input, and second, or output, polarizers will be assumed to be in the vertical and horizontal planes, respectively, as represented by arrows 9 and 10. It will be appreciated that in practice they may be at an angle, the only requirement being that the planes are at right angels.

Each switching cell of the matrix is conveniently considered as an area of electro-optically active material 11 lying within and bounded by two opposed pairs of electrodes 12, 13 and 14, 15. The first pair of electrodes 12, 13 are formed and positioned such that, when a voltage difference exists between them, they apply an electric field in the vertical direction to the material of the cell, as indicated by arrow 16. The second pair of electrodes 14, 15 are similar to the first pair, but they are positioned to apply an electric field in the horizontal direction as indicated by arrow 17.

The propagation rates for components of light parallel and perpendicular to the electric field are different in a cell of electro-optically active, or birefringent, material. Consequently, if the electric field is neither parallel nor perpendicular to the plane of polarization of the first polarizer, the plane polarized light incident on the cell from the first polarizer such as the polarizer 3 (FIGURE 1), emerges from the cell with elliptical polarization. The elliptically polarized wave has a component in the plane of polarization of the second polarizer, such as the polarizer 6 (FIGURE 1), so that light is transmitted through the system.

It can be shown that the intensity of the light transmitted through the second polarizer is proportional to $\sin^2 2\theta \sin^2 (B/2)$, where $\theta$ is the angle between the plane of polarization of the light incident on the cell and the direction of the electric field and B is the phase difference produced by the cell for light components parallel and perpendicular to the direction of the field. The term $\sin^2 2\theta$ has the value zero for $\theta=0°, 90°, 180°$ and $270°$ and the value one for $\theta=45°, 135°, 225°$ and $315°$.

In the present case, the fields are parallel and perpendicular to the plane of polarization of the first polarizer, as indicated in FIGURE 1 by arrows 16 and 17, so that either one of these fields alone will produce no transmission of light, irrespective of the magnitude of the field. However, if both fields are applied together, the resultant field vector will make an angle with the plane of polarization of the first polarizer which is a function of the relative magnitude of the two fields. It will be clear that optimum transmission occurs when the two fields are equal, giving a resultant field at 45°, 135°, etc., as indicated by dashed arrow 18, and that this transmission is independent of the polarity of the fields.

The actual degree of light transmission is also a function of $\sin^2 (B/2)$ and will be a maximum when $B=180\%$. Large values of electric field are necessary to obtain such a large phase difference and it is preferable, in practice, to use smaller fields and to allow for the lower transmission in the overall design of the system. A suitable practical value for $B/2$ is approximately 66°, which gives a maximum value to $$\sin^2 \frac{B}{2}/B$$

The theoretical transmission for $B/2=66°$ is approximately 41%. At the maximum value of $$\sin^2 \frac{B}{2}/B$$

the ratio of the light transmission to the electrical energy expended in operating the switch is a maximum. A matrix of electro-optical switches is conveniently formed by arranging the individual switch areas or cells in rows and columns, such as is indicated in FIGURE 2 which shows a pattern of electrodes 39 applied to a suitable crystal of electro-optically active material. In this figure, two opposed pairs of electrodes bound each of the cells. A matrix of only six cells is shown, but it will be appreciated that much larger matrices are usual in practice. The electrodes of the rows are respectively connected together by row conductors 19–22, and similar column conductors 23–25 are provided for the columns of electrodes. If all the conductors 19–25 are initially at ground potential, none of the cells are subject to an electric field and no light is transmitted through the system. If now, the row conductors 19 and 20 are connected to a suitable voltage an electrical field acts in the direction of arrows 26 only upon the switch cells in the row between the electrodes connected to the row conductors 20 and 21. In the same way, the application of a similar voltage to column conductors 24 and 25 produces an electrical field, represented by arrows 27, acting only on those cells in the column between column conductors 23 and 24. Thus, there is only one cell which has both a horizontal and vertical field and this cell will therefore be selected to allow the passage of light through the system.

The matrix 4 shown in FIGURE 3 has rows and columns of switch areas or cells and a single cell is selected in a somewhat similar way by the coincident application of row and column fields. For example, as will be seen from the figure, each switch area or cell is bounded by two opposed pairs of electrodes 28, 29 and 30, 31. Of these, the pairs 28 and 29 are column electrodes and the pairs 30, 31 are row electrodes. All electrodes 28 of a column are connected together to a column selection conductor 32 and there is thus a separate conductor for each column of electrodes 28. In a similar manner, row conductors 33 are provided, one for each row, and all the row electrodes 31 of a single row are connected to the appropriate one of the conductors 33. The remaining electrodes 29 and 30 of the pairs are all connected in common to ground. Thus, in order to operate a selected cell, a suitable voltage is applied to the one of the row conductors 33 and the one of the column conductors 32 which are connected to the electrodes of that cell. This produces an electric field between each of the pairs of electrodes and, since the fields are equal, the resultant field vector is at one of the optimum transmission angles of 45°, 135°, etc. Consequently, the polarized light incident on this cell is elliptically polarized in transmission. This light passes through an area 38 of the storage film 5 corresponding to the selected cell and impinges on the second polarizer 6. The polarizer 6 passes the horizontally polarized component of the incident light, which is focussed by the optical system 7 on the photosensitive device 8. The photosensitive device produces an electrical output signal which is representative of the information stored in the selected area of the photographic film and which is passed to an output amplifier 34.

All the other cells in the same row as the selected cell are subject to an electric field in the vertical direction. Similarly, the other cells in the column including the selected cell are subject to an electric field in the horizontal direction. These fields are at two of the angles 0°, 90°, 180°, etc., for which transmission through the system is zero. Consequently, light reaches the photosensitive device only via the one selected cell and its associated film area 38. As previously noted, it is assumed for convenience that the planes of polarization of the polarizers 3 and 6 are respectively vertical and horizontal, but it will be appreciated that the essential requirements are that they are at right angles and that they are substantially parallel to the columns and rows of the matrix of cells.

It will be apparent from the previous discussion that a cell cannot be operated by one applied field only, so that the magnitude of the control voltages has no effect on the selection of the cell. The row and column control voltages should be substantially equal in order to provide optimum transmission conditions for the selected cell. However, the transmission is dependent on the size of the angle between the resultant field vector and the plane of polarization of the incident light, so that ±5° deviation in the angle does not cause any serious degradation of performance.

The selection of the required row and column conductors 33 and 32, respectively is performed in the conventional manner by using an X and Y co-ordinate selection system. For example, FIGURE 3 shows an X voltage source 34 and a Y voltage source 35 which are both arranged to produce a suitable potential with respect to ground, and each source is connected through an appropriate distribution or selection network 36, 37 to the row and column conductors, respectively.

It will be realised that the photographic storage film matrix 5, has a storage area 38 associated with each switching cell of the matrix, and that there may also be provided a masking plate in the conventional manner to ensure that the interrogation of the film is confined solely to the storage areas 38.

The magnitude of the resultant field determines the values of B and, accordingly, the degree of transmission through a selected cell. However, as already mentioned, the value of B is not critical, and any value which is sufficient to ensure a reasonable signal/noise ratio of the output signal from the photosensitive device may be used.

Various other electrode configurations may be used to provide the necessary electric fields. For example, one electrode of each pair is always at ground potential as shown in FIGURE 3, so that these may be combined into a single electrode which is grounded directly. Each cell then has single row and column selection electrodes and a common ground electrode. Furthermore, the grounded electrodes of adjacent cells may be provided by a single common electrode.

It will be appreciated that each cell in the matrix is, in fact, a two-input electro-optical AND gate. Consequently, such an individual cell may be used to perform this logic function apart from the previously described application in a storage selection matrix.

The cells may be made of any suitable electro-optically active material, such as the barium titanate crystals described in the U.S. patent specification already referred to, or other materials with a relatively large quadratic electro-optic effect such as nitrobenzene and strontium titanate.

What is claimed is:

1. An electro-optical device including first and second polarizers spaced apart along a light transmission path respectively having planes of polarization, said planes of polarization respectively being mutually substantially perpendicular, a member of electro-optically active material positioned between said first and second polarizers in said light transmission path, and means for applying to said material first and second electrical control fields wherein each field acts in a plane perpendicular to said light transmission path and said first field is parallel to said plane of polarization of said first polarizer and said second field is parallel to said plane of polarization of said second polarizer.

2. A device as claimed in claim 1 wherein means for applying first and second electrical control fields include
a first pair of parallel electrodes applied to said material perpendicular to the plane of polarization of said first polarizer and in a plane perpendicular to said light transmission path and
a second pair of parallel electrodes applied to said material perpendicular to the plane of polarization of said second polarizer and in a plane perpendicular to said light transmission path.

3. A device as claimed in claim 2 including means for selectively applying electrical potentials to said first and second pairs of electrodes.

4. A device as claimed in claim 1 including a source of light and light detecting means spaced along a light transmission path,
a pattern of electrodes applied to said electro-optically active material, the electrodes in said pattern being arranged so that a switching area lies between each two opposed pairs of electrodes, each two opposed pairs bounding an individual switching area being spaced apart such that a first pair of electrodes is parallel to the plane of polarization of said second polarizer and second pair of electrodes is parallel to the plane of polarization of said first polarizer,
both of said pairs of electrodes arranged in a plane perpendicular to said light transmission path,
and means for selectively applying electrical potentials to said first and second pairs of electrodes for producing said first and second electric control fields.

5. In an electro-optical device,
a first polarizer positioned in and perpendicular to a light transmission path,
a second polarizer positioned in and perpendicular to said path with a plane of polarization perpendicular to the plane of polarization of said first polarizer,
a substantially planar electro-optically active material positioned between said polarizers and perpendicular to said path,
first and second electrical drive means acting upon said material for producing first and second electrical control fields wherein each field acts in a plane perpendicular to said light transmission path and said first field is parallel to said plane of polarization of said first polarizer and said second field is parallel to said plane of polarization of said second polarizer,
whereby said first and second drive means produce a resultant electrical field in the plane of said material for allowing optical transmission through said device.

6. A device as claimed in claim 5 wherein said electrical drive means includes
a first pair of parallel electrodes oriented parallel to the plane of polarization of said second polarizer,
a second pair of parallel electrodes oriented parallel to the plane of polarization of said first polarizer,
and means to energise both said pairs of electrodes to produce a resultant electrical field in the plane of said material to elliptically polarize light therethrough.

7. A device as claimed in claim 6 wherein said first and second pairs of electrodes define a switching area on said electro-optically active material.

8. A device as claimed in claim 7 wherein a plurality of groups of first and second pairs of electrodes are arranged in a common plane on one side of said electro-optically active material in a matrix configuration,
and wherein said drive means are operable for selectively energising one group of said first pairs of electrodes and one group of said second pairs of electrodes to provide a resultant field for elliptically polarizing light through a particular switched area.

9. A device as claimed in claim 7 including an information storage member positioned in said light transmission path and containing discrete areas for storing information,
said discrete areas aligned with corresponding areas on said electro-optically active material,
said information being transmitted to an output upon energisation of a set of first and second pairs of electrodes associated with a particular switching area.

References Cited

UNITED STATES PATENTS

| | | |
|---|---|---|
| 2,909,973 | 10/1959 | Koelsch et al. |
| 2,928,075 | 3/1960 | Anderson _____ 350—150 X |
| 2,936,380 | 5/1960 | Anderson _____ 350—150 |
| 3,027,806 | 4/1962 | Koelsch et al. _____ 350—150 |
| 3,312,957 | 4/1967 | Fleisher et al. _____ 350—150 X |

DAVID SCHONBERG, *Primary Examiner.*

P. R. MILLER, *Assistant Examiner.*

U.S. Cl. X.R.

340—173.2; 350—160